(12) United States Patent
Schoderböck et al.

(10) Patent No.: US 11,447,066 B2
(45) Date of Patent: Sep. 20, 2022

(54) LIGHTING DEVICE FOR A MOTOR VEHICLE HEADLIGHT

(71) Applicant: ZKW Group GmbH, Wieselburg (AT)

(72) Inventors: Peter Martin Schoderböck, Rosenau am Sonntagberg (AT); Bernhard Mandl, Ober-Grafendorf (AT)

(73) Assignee: ZKW Group GmbH, Weiselburg (AT)

( * ) Notice: Subject to any disclaimer, the term of this patent is extended or adjusted under 35 U.S.C. 154(b) by 0 days.

(21) Appl. No.: 17/295,635

(22) PCT Filed: Dec. 15, 2020

(86) PCT No.: PCT/EP2020/086175
§ 371 (c)(1),
(2) Date: May 20, 2021

(87) PCT Pub. No.: WO2021/122565
PCT Pub. Date: Jun. 24, 2021

(65) Prior Publication Data
US 2022/0134943 A1    May 5, 2022

(30) Foreign Application Priority Data

Dec. 16, 2019 (EP) .................................... 19216446

(51) Int. Cl.
*F21S 41/147* (2018.01)
*B60Q 1/30* (2006.01)
(Continued)

(52) U.S. Cl.
CPC ............... *B60Q 1/30* (2013.01); *B60Q 1/28* (2013.01); *F21S 41/147* (2018.01); *F21S 41/25* (2018.01); *F21S 41/321* (2018.01)

(58) Field of Classification Search
None
See application file for complete search history.

(56) References Cited

U.S. PATENT DOCUMENTS

2014/0226357 A1* 8/2014 Brendle ................ F21S 41/285
                                                              362/547
2014/0321143 A1   10/2014 Hossfeld et al.
2017/0292671 A1* 10/2017 Gousset-Rousseau .....................
                                                              F21S 41/285

FOREIGN PATENT DOCUMENTS

DE    102009022848 A1    12/2010
DE    102017103402 A1     8/2018
(Continued)

OTHER PUBLICATIONS

International Search Report for Application No. PCT/EP2020/086175, dated Mar. 15, 2021. (2 pages).

*Primary Examiner* — Elmito Breval
(74) *Attorney, Agent, or Firm* — Eversheds Sutherland (US) LLP (57) ABSTRACT

The invention relates to a lighting device (1) which comprises an imaging unit (2) which is configured to generate an intermediate light image in an imaging plane (ZBE, ZBE'), wherein each imaging unit (2) is composed of a light source (3) and a collimator optics (4), wherein the collimator optics (4) are designed in such a way that the light emitted by the light source (3) in the imaging plane (ZBE, ZBE') is imaged as an intermediate light image, and wherein the lighting device (1) comprises a projection lens (5) which has a focal plane (BE), and the imaging unit (2) and the projection device (5) are arranged with respect to one another in such a way that the imaging plane (ZBE, ZBE') lies substantially in the focal plane (BE) of the at least one projection device (5). According to the invention, the imaging unit (2) is designed as a convergence imaging unit (2) being characterized in that the body (4A) of the collimator optics (4) is designed such that the light, which is coupled into the body (4A) via the light coupling region (41A) form a collimator body light bundle (KLB, KLB') converging into a common virtual intermediate light image plane (VBE, VBE'), wherein the virtual intermediate light image plane (VBE, VBE') lies in front of the imaging plane (ZBE, ZBE') of the convergence imaging unit (2) in the direction of light propagation, (Continued)

and wherein a light exit surface (41C) of the body (4A) is designed in such a way that when the collimator body light bundle (KLB, KLB') exits from the body (4A), the light beams are deflected at the light exit surface (41C) and are formed into an exit light bundle (ALB, ALB') such that the light beams of the exit light bundle (ALB, ALB') form the intermediate light image in the imaging plane (ZBE, ZBE'), which intermediate light image lying in the imaging plane is imaged by the projection device (5) into a region in front of the lighting device (1), e.g. into a traffic area in front of the motor vehicle in the case of a lighting device installed in a motor vehicle, as a light distribution or part of a light distribution.

18 Claims, 6 Drawing Sheets

(51) Int. Cl.
      *B60Q 1/28*       (2006.01)
      *F21S 41/25*      (2018.01)
      *F21S 41/32*      (2018.01)

(56) References Cited

FOREIGN PATENT DOCUMENTS

| | | | |
|---|---|---|---|
| EP | 2505910 | A2 | 10/2012 |
| EP | 3260764 | A1 | 12/2017 |

\* cited by examiner

LIGHTING DEVICE FOR A MOTOR VEHICLE HEADLIGHT

The invention relates to a lighting device for a motor vehicle headlight and/or for a rear light of a motor vehicle and/or for a signal light for a motor vehicle for generating at least one light distribution or a partial light distribution, wherein the lighting device comprises one or more imaging units, wherein each imaging unit is configured to generate an intermediate light image in an imaging plane specific for the respective imaging unit, wherein each imaging unit is composed of a light source and a collimator optics or comprises a light source and a collimator optics, wherein the collimator optics consist in each case of a body which is formed from a transparent, light-guiding material, wherein the body has a light coupling region, a delimiting surface, and a light exit surface, and wherein light coupled into the body via the light coupling region is partly propagated directly in the direction of the light exit surface and is partly directed to the delimiting surface, on which it is reflected in the direction of the light exit surface, preferably totally reflected, and wherein the collimator optics of each imaging unit are designed in such a way that the light emitted by the light source of the respective imaging unit in the imaging plane specific for the respective imaging unit is imaged as an intermediate light image, and wherein the lighting device comprises at least one projection device, in particular at least one projection lens, having an optical axis, which at least one projection device has a focal plane.

In the development of lighting devices, for example for vehicle headlights such as motor vehicle headlights, design is playing an increasingly important role. The increasingly limited installation space in motor vehicles results in ever higher demands on the compactness of the lighting devices while at the same time meeting the legally required light values.

A lighting device having a collimator is known, for example, from EP 2 799 761 A2.

It is an object of the invention to allow for the implementation of lighting devices, in particular lighting devices for motor vehicles or for motor vehicle headlights, which are compact and have a high degree of photometric efficiency.

This object is achieved with a lighting device mentioned at the outset in that, according to the invention, at least one of the imaging units is designed as a so-called convergence imaging unit, a convergence imaging unit being characterized in that the body of the collimator optics is designed such that that part of the light, which is coupled into the body via the light coupling region and propagates directly in the direction of the light exit surface, as well as the other part of the coupled light which is reflected on the delimiting surface, in particular totally reflected, form a collimator body light bundle converging into a common virtual intermediate light image plane, the light exit surface being concavely curved and the virtual intermediate light image plane (VBE, VBE') lying in front of the specific imaging plane of the convergence imaging unit in the direction of light propagation, the virtual imaging plane being a plane in which a real intermediate image would only be generated if the light beams were not deflected on the light exit surface of the body, and the light exit surface of the body being designed in such a way that when the collimator body light bundle exits from the body, the light beams are deflected at the light exit surface and are formed into an exit light bundle, such that the light beams of the exit light bundle form the intermediate light image in the imaging plane, the imaging plane being inclined to the focal plane and intersecting the focal plane, preferably in the region of the optical axis or above or below the optical axis, and the intermediate light image lying in the imaging plane being imaged by the projection device into a region in front of the lighting device, e.g. into a traffic area in front of the motor vehicle in the case of a lighting device installed in a motor vehicle, as a light distribution or part of a light distribution.

As a result of the configuration according to the invention and the use of one or more convergence imaging units, these can be made more compact, in particular lower and/or with a smaller width than conventional imaging units known from the prior art.

Imaging units known in the prior art have, for example, collimator optics which align the light beams coupled in from a light source, in particular an LED, in parallel, the parallel light beams exiting via an often planar light exit surface. This creates an intermediate light image that is large in height and/or width, which requires a correspondingly large (high, wide) projection lens for imaging.

In the present invention, however, a small intermediate light image can be generated by the collimator optics of a convergence imaging unit, as a result of which the downstream projection device can also be smaller than in comparable imaging units from the prior art.

The light coupling region and preferably also the delimiting surface is designed in such a way that it shapes the coupled-in light into a collimator body light bundle which converges into a virtual intermediate light image plane, as described above.

A convergence imaging unit or each convergence imaging unit can be designed in such a way that light beams of the exit light bundle of a convergence imaging unit converge, wherein the light beams of the exit light bundle preferably converge less than the light beams of the collimator body light bundle.

It can be provided that the virtual intermediate light image plane of a convergence imaging unit lies in the light propagation direction after the light exit surface.

The collimator optics are preferably rotationally symmetrical or the light exit surface is symmetrical in the vertical direction.

It can be provided that an aperture device is provided between the at least one convergence imaging unit and the projection device, having at least one aperture edge, which at least one aperture edge lies substantially in the focal plane of the projection device.

In particular, it can be provided that the aperture device is a horizontal, preferably flat aperture, which has the aperture edge preferably in a front region facing the projection device.

For example, the aperture lies in an approximately horizontal plane when the lighting device is in the installed position.

The aperture edge can be straight, but its course is preferably curved and preferably follows the course of a focal plane or focal curve of the projection device.

Furthermore, it can be favorable if the aperture device, in particular the horizontal aperture, is reflective on one or both sides, for example on its upper side and/or on its underside.

In this way, light from the exit light bundle which strikes the aperture can be reflected in the direction of the projection device and can thus be used, which increases the efficiency.

It can be provided that the lighting device has a plurality of imaging units, and wherein at least two of the imaging units, preferably all imaging units, are designed as convergence imaging units.

It can be provided that at least one of the convergence imaging units, preferably a plurality of or all of the convergence imaging units jointly generate a first light distribution, e.g. a low beam distribution.

Alternatively or additionally it can be provided that at least one of the convergence imaging units, preferably a plurality of or all of the convergence imaging units jointly generate a second light distribution, e.g. a high beam distribution, or jointly generate a part of a second light distribution, which part together with the first light distribution results in the second light distribution, e.g. high beam distribution.

In this context, it can be provided that convergence imaging units, preferably a plurality of or all convergence imaging units, which together generate a first light distribution, are arranged on one side, e.g. above or below the aperture device.

Furthermore, it can be provided that convergence imaging units, preferably a plurality of or all convergence imaging units, which together generate a second light distribution, are arranged on one side, e.g. below or above the aperture device, in particular on the other side than that side on which the at least one convergence imaging unit for generating the first light distribution.

For example, in the case of a plurality of convergence imaging units on one side of the aperture device, these convergence imaging units are arranged in one plane, preferably a plane parallel to the aperture device.

In this case, it can be provided that, in the case of a plurality of convergence imaging units on one side of the aperture device, these convergence imaging units are rotated horizontally and/or vertically with respect to one another, in particular in such a way that the intermediate light images generated by the convergence imaging units in the imaging plane preferably at least partially overlap or adjoin the immediately adjacent intermediate light images in each case.

For example, the lighting device is designed as a motor vehicle headlight or rear light of a motor vehicle or as a signal light for a motor vehicle.

The invention further relates to a device comprising one or more lighting devices as described above, for example for generating a high beam distribution, a low beam distribution, or a low beam and high beam distribution.

The invention is explained in more detail below with reference to the drawing. In the drawing.

Figure 1:
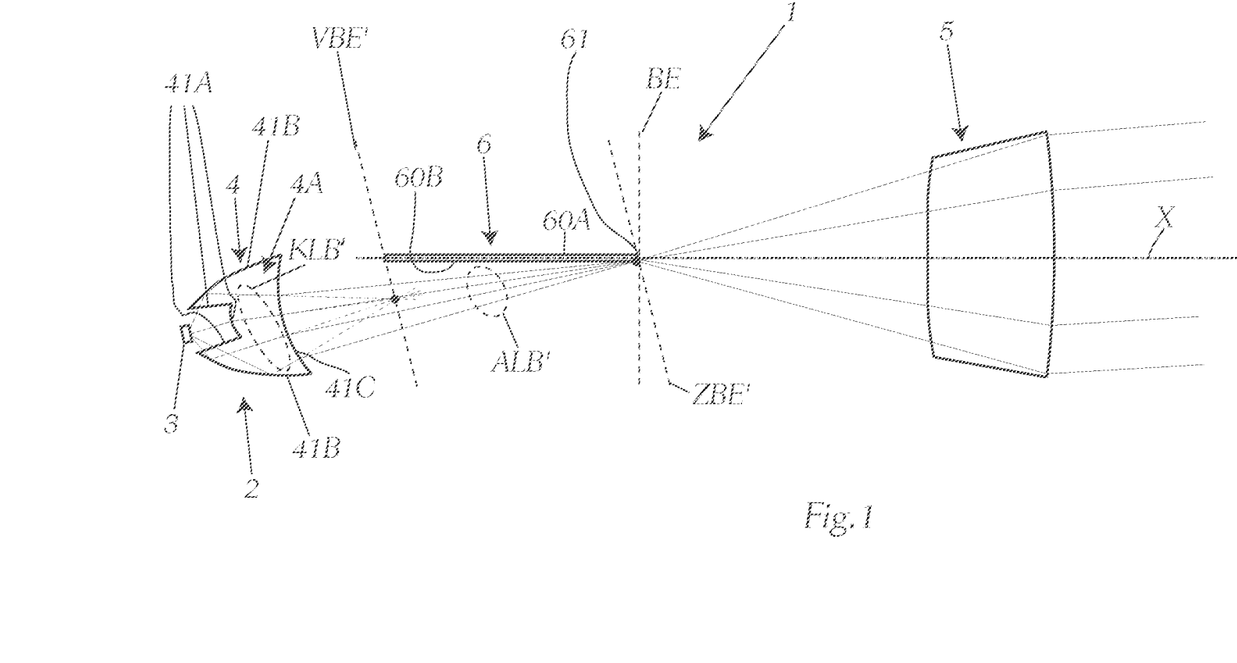
FIG. 1 schematically shows a lighting device according to the invention with a convergence imaging unit in a vertical section, FIG. 2 schematically shows a lighting device according to the invention with two convergence imaging units in a vertical section.

FIG. 1 shows schematically a lighting device 1 in which an imaging unit 2 can be seen. The imaging unit 2 comprises a light source 3, for example one or more LEDs, and collimator optics 4.

The collimator optics 4 consist in each case of a body 4A which is formed from a transparent, light-guiding material, wherein the body 4A has a light coupling region 41A or light coupling surfaces 41A, a delimiting surface 41B, and a light exit surface 41C, and wherein light coupled into the body 4A via the light coupling region 41A is partly propagated directly in the direction of the light exit surface 41C and is partly directed to the delimiting surface 41B (=outer surface of the body 4A), on which it is reflected in the direction of the light exit surface 41C, preferably totally reflected.

The collimator optics 4 are designed in such a way that the light emitted by the light source 3 in an imaging plane ZBE' of the imaging unit is imaged as an intermediate light image.

For example, in the general context and not only in connection with the figure described, the intermediate light image, viewed in the light propagation direction, lies where the beam under consideration has the smallest vertical and/or horizontal extent.

Furthermore, the lighting device 1 comprises a projection device 5, for example in the form of a projection lens 5 which has a focal plane BE, wherein the focal plane BE lies substantially in the imaging plane ZBE' of the imaging unit 2. The reference sign X denotes the optical axis of the projection lens 5.

According to the invention, the imaging unit 2 is designed as a so-called convergence imaging unit 2 being characterized in that the body 4A of the collimator optics 4 is designed such that that part of the light, which is coupled into the body 4A via the light coupling region 41A and propagates directly in the direction of the light exit surface 41C, as well as the other part of the coupled light which is reflected on the delimiting surface 41B, in particular totally reflected, form a collimator body light bundle KLB' converging into a common virtual intermediate light image plane VBE'. The virtual intermediate light image plane VBE' lies in front of the imaging plane ZBE' of the convergence imaging unit 2 in the direction of light propagation lies.

The term "virtual" is to be understood in such a way that a (real) intermediate image would only be generated in this virtual imaging plane if the light beams at the light exit surface 41C of the body 4A would not experience any deflection, i.e., only the shape of the body 4A (light coupling region 41A and lateral surface 41B), but without the involvement of the light exit surface 41C, would have an influence on the position of the intermediate image.

The light exit surface 41C of the body 4A is now designed in such a way that when the collimator body light bundle KLB' (converging into the virtual intermediate image plane) exits from the body 4A, the light beams are deflected at the light exit surface 41C and are formed into an exit light bundle ALB' such that the light beams of the exit light bundle ALB' form the (real) intermediate light image in the imaging plane ZBE', which image is imaged by the projection device 5 into a region in front of the lighting device 1, e.g. into a traffic area in front of the motor vehicle in the case of a lighting device installed in a motor vehicle, as a light distribution or part of a light distribution.

It is preferably provided that the body 4A is designed in such a way that light beams from the exit light bundle ALB' converge, wherein the light beams of the exit light bundle ALB' preferably converge less than the light beams of the collimator body light bundle KLB'.

Furthermore, in the embodiment shown, it can be provided that the virtual intermediate light image plane VBE' lies in the light propagation direction after the light exit surface 41C of the body 4A.

The light exit surface 41C of the body 4A of the collimator optics 4 of the convergence imaging unit 2 is preferably concavely curved and, for example, rotationally symmetrical or symmetrical in the vertical direction.

In the example shown according to FIG. 1, the light beams exiting from the projection device 5 form the region of a high beam distribution that is above a light-dark boundary.

Optionally, in the example shown, an aperture device 6 is also provided, which is arranged between the convergence imaging unit 2 and the projection device 5. The aperture device has an aperture edge 61 which preferably lies substantially in the focal plane BE of the projection device 5 or preferably in front of the focal plane BE, in particular just in front of it.

It can preferably be provided that the aperture device 6 is a horizontal, preferably flat aperture 60, the aperture edge 61 being in a front region facing the projection device 5. For example, the aperture lies in an approximately horizontal plane when the lighting device 1 is in the installed position. The horizontal plane preferably contains the optical axis X.

The aperture edge 61 can be straight, but its course is preferably curved and preferably follows the course of a focal plane or focal curve of the projection device 5.

By means of the aperture device, light which would undesirably pass in front of the focal plane BE via the optical axis X can be blocked out.

It can be favorable if the aperture device 6, in particular the horizontal aperture 60, is reflective or is designed to reflect light on one or both sides, for example on its upper side 60A and/or on its underside 60B. In this way, light from the exit light bundle ALB' which strikes the aperture on the underside can be reflected in the direction of the projection device 5 and can be used, which increases the efficiency, and/or, for example, specific regions above the light-dark boundary can be illuminated, for example to generate a sign light.

The aperture device 6 can also be designed and/or arranged in such a way, for example as described above, that the aperture edge 61 is imaged in the light distribution as the light-dark boundary delimiting the (partial) light distribution downwards. In this case, it is advantageous if the aperture edge 61 lies in front of the focal plane BE so that the image of the aperture edge 61 is defocused and therefore not too sharp.

Due to the upward inclination of the collimator imaging unit 2, the imaging plane ZBE' does not run parallel to the focal plane BE but is inclined thereto. The imaging plane ZBE' preferably intersects the focal plane BE below the optical axis X, in particular just below the optical axis (in typical systems about 0.1 mm below it).

Figure 2:
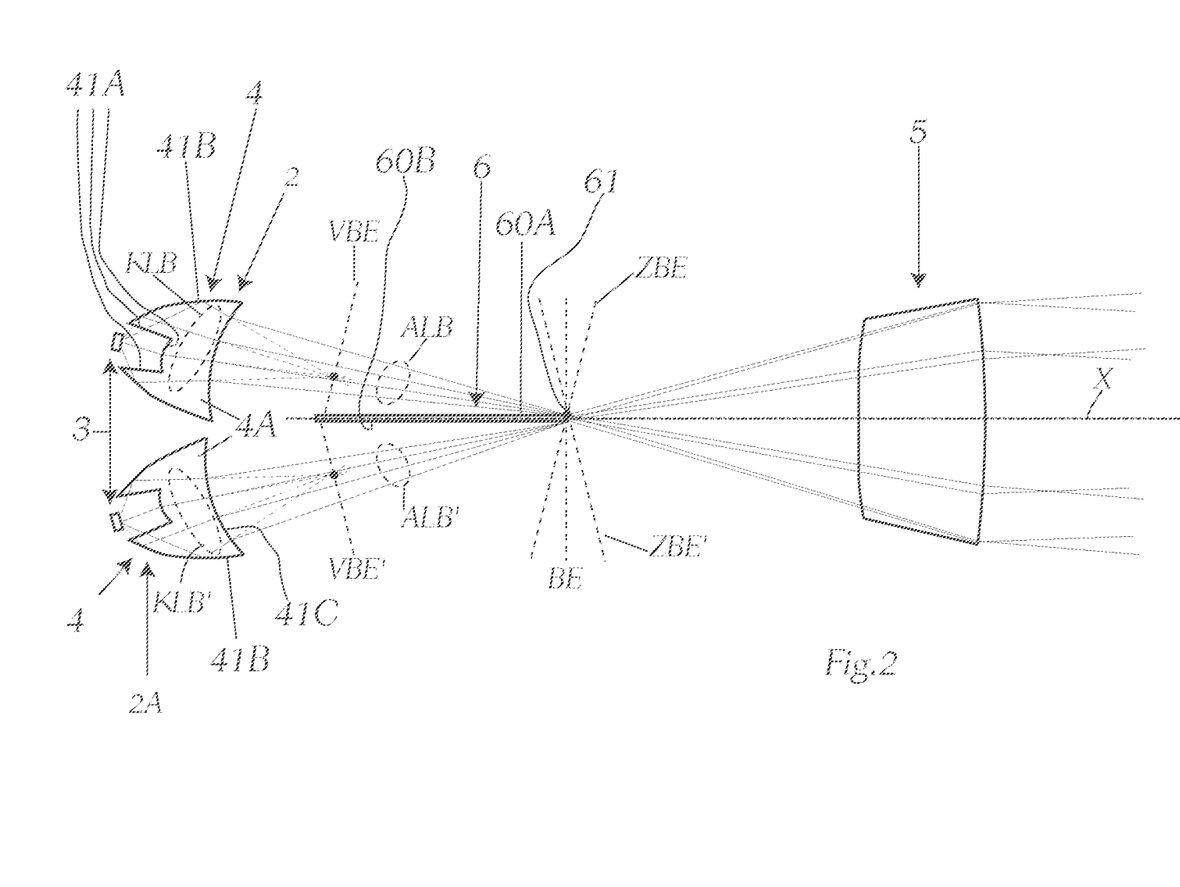

FIG. 2 shows a structure similar to that from FIG. 1, with the difference that here, in addition to a lower convergence imaging unit 2A, which is inclined upwards, a second convergence imaging unit 2 is provided in an upper region, which is in particular inclined downwards. The arrangement in FIG. 2 again has the optional aperture device 6, but can function just as in FIG. 1.

The upper convergence imaging unit 2 has the same structural and optical design as the lower unit 2A; in principle, these can also be embodied identically. The upper convergence imaging unit 2 generates a collimator light bundle KLB, which converges into a virtual intermediate light image plane VBE and is shaped by the light exit surface 41C of the body 4A into an exit light bundle ALB, which is imaged in an imaging plane ZBE, which is roughly in the focal plane BE of the projection device 5, so that the intermediate light image from the imaging plane ZBE is imaged as a light distribution, in the specific case as a low beam distribution.

The lower imaging unit 2A generates a light distribution as explained with reference to FIG. 1.

If an aperture device 61 is present, it is preferably arranged and/or designed as described in connection with FIG. 2, so that the aperture edge 61 is preferably imaged in the low beam distribution as a light-dark boundary that limits the light distribution upwards.

In general, if an aperture device 6 is present, it can contribute to the formation of the light distribution, for example in that the aperture edge 61 in the light image is imaged as a light-dark boundary of the light distribution, which closes this light distribution towards the top. In the event that an aperture device 6 is dispensed with, the general rule is that the projection device, for example the projection lens, is to be tuned so that the desired light distribution or the desired light distributions, such as low beam and/or high beam distribution, are generated.

In the example shown according to FIG. 2 (and also according to FIG. 1), the lower unit 2A is inclined (in particular slightly) upwards, and the upper unit 2 is inclined (in particular slightly) downwards (for example, the respective collimator axis or axis of the respective unit 2, 2A is correspondingly inclined relative to the aperture or aperture edge). Correspondingly, the imaging planes ZBE, ZBE' are not parallel or congruent to one another, but are inclined to one another and intersect approximately in the region of the focal plane BE of the projection device 5.

The imaging plane ZBE' preferably intersects the focal plane BE below the optical axis X, in particular just below the optical axis (in typical systems about 0.1 mm below it), while the imaging plane ZBE of the upper imaging unit 2 intersects the focal plane just above the optical axis, in particular just above the optical axis (e.g. approx. 0.1 mm above).

Depending on whether the projection device has an inverting effect on the light beams in the vertical direction (as in the examples shown) or not, these relationships can of course also be exactly the opposite.

Figure 3:
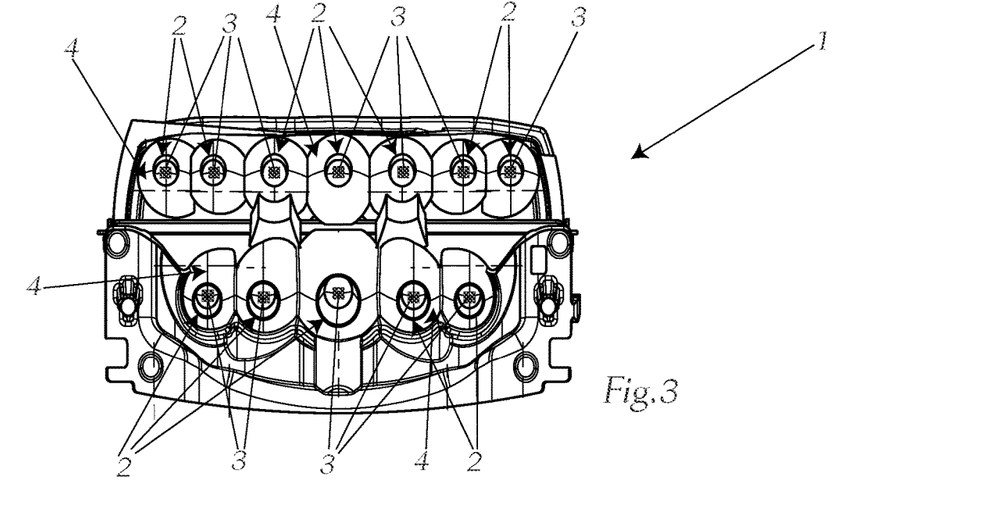
FIG. 3 shows a lighting device according to the invention with a plurality of imaging units in a view from the rear by way of example.

FIG. 3 shows a lighting device with 2 rows of convergence imaging units 2, an upper row of seven units 2 (convergence imaging units) and a lower row of five units 2. Each unit has a light source 3 and a collimator 4 as described above with reference to FIGS. 1 and 2.

Figure 4:
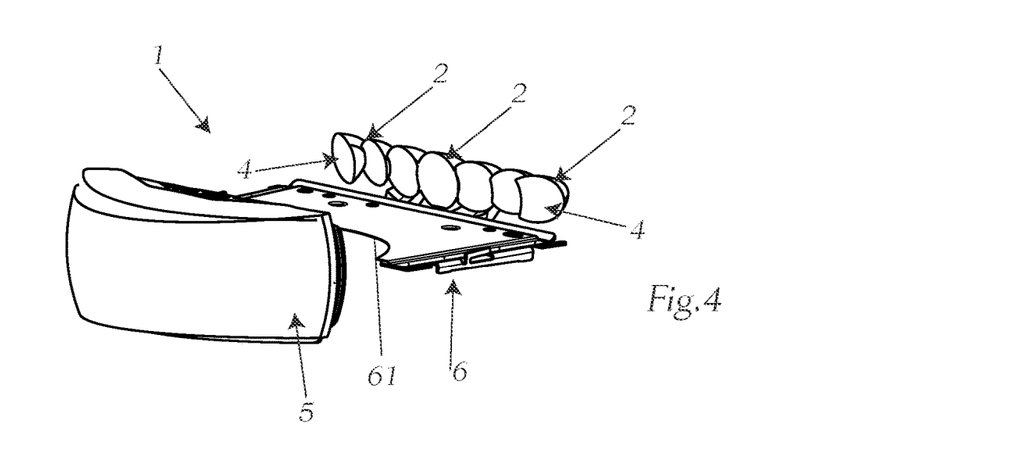
FIG. 4 shows an upper part of the lighting device according to the invention from FIG. 3 in a perspective view by way of example.

FIG. 4 shows the lighting device from FIG. 3, but only the upper row of the units 2. As can be seen, for an optional vertical tilting of the units 2, as shown in FIG. 2, they can also be tilted in the horizontal direction in order to combine the partial light images generated by the individual units 2 into a desired overall light distribution. In this embodiment, an aperture device 6 having a curved aperture edge 61 is also optionally provided (as shown).

By horizontally rotating the convergence imaging units 2, it can be achieved, for example, that the intermediate light images generated in the respective intermediate light image plane, preferably the immediately adjacent intermediate light images of the individual units 2, in particular the units of a row, partially overlap or directly adjoin one another, i.e. in the horizontal direction.

Figure 5:
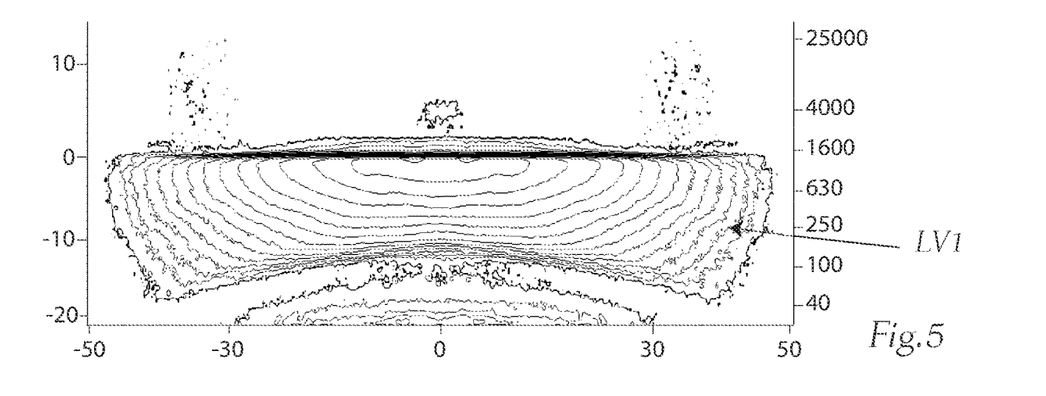
FIG. 5 shows a light distribution generated with the arrangement from FIG. 4 by way of example.

FIG. 5 shows the light distribution LV1 generated with the arrangement from FIG. 4, which is a low beam distribution with an HD limit. The low beam distribution can be generated by just a single arrangement shown in FIG. 4, or by superimposing the light distributions of two or more arrangements of this type, which are distributed to two or more lighting devices, for example in one or in two headlights.

Figure 6:
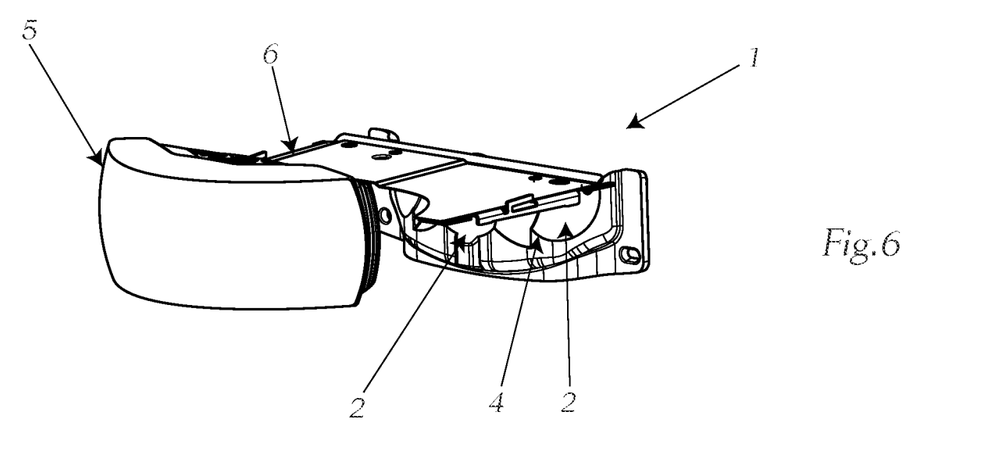
FIG. 6 shows the lower part of the lighting device according to the invention from FIG. 3 in a perspective view by way of example.
Figure 7:
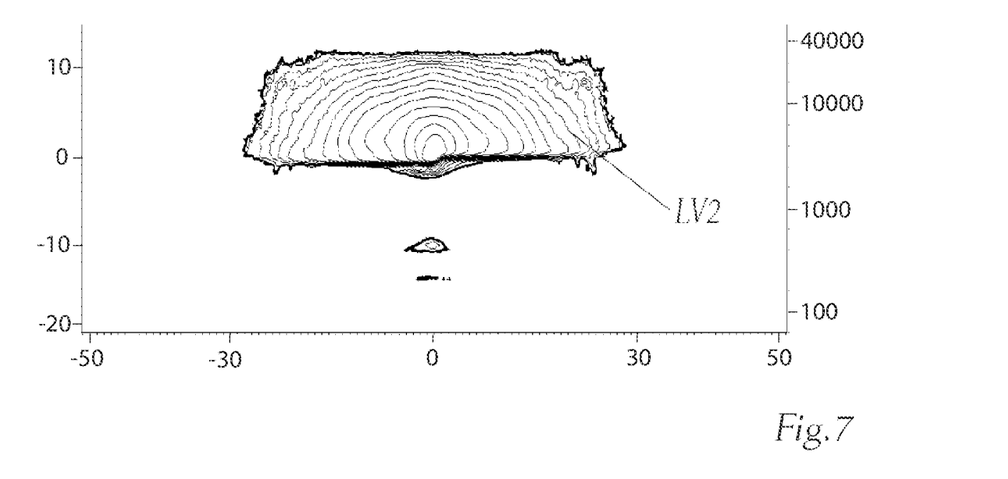
FIG. 7 shows a light distribution generated with the arrangement from FIG. 6 by way of example.

FIG. 6 analogously shows the lower part of the lighting device from FIG. 4, again with optionally horizontally and/or vertically rotated units 2; the resulting light distribution LV2 is shown in FIG. 7 and shows the region of a high beam distribution that is above the horizontal 0°-0° line or above the HD line which region forms a high beam distribution together with the light distribution from FIG. 5. The region relevant for the formation of this upper part of a high beam distribution can be generated by just one arrangement shown in FIG. 6, or by superimposing the light distributions of two or more arrangements of this type, which are distributed to two or more lighting devices, for example in one or in two headlights.

The arrangement from FIG. 4 and FIG. 6 are preferably implemented in a single lighting device as shown in FIG. 3 (the aperture 6 being shown only twice for the sake of illustration, once in each drawing; in fact, only one aperture 6 is present if it is provided at all). However, each of the arrangements from FIG. 4 or FIG. 6, in each case with or without an aperture, can also be implemented as an independent lighting device.

Figure 8:
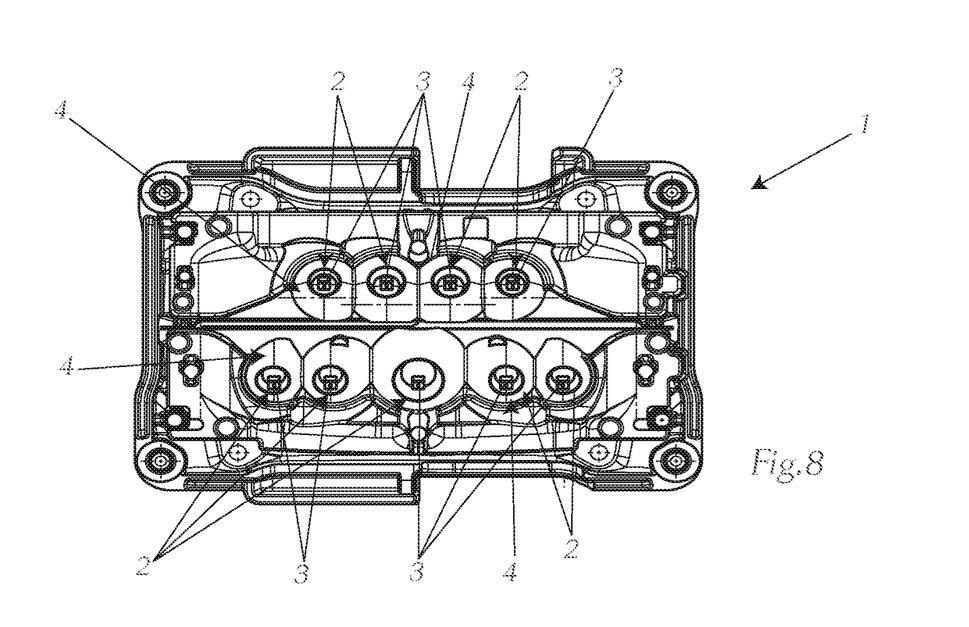
FIG. 8 shows a further lighting device according to the invention with a plurality of imaging units in a view from the rear by way of example.
Figure 9:
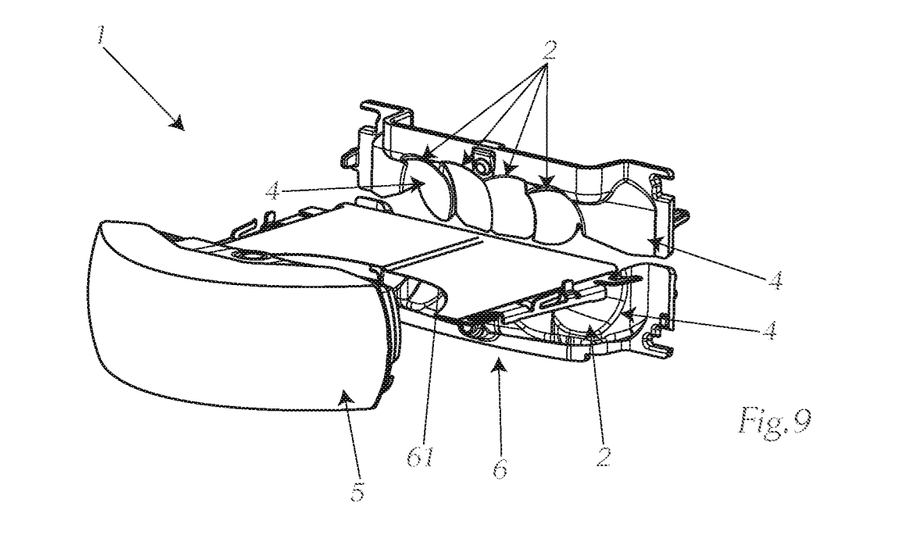
FIG. 9 shows the lighting device according to the invention from FIG. 8 in a perspective view.
Figure 10:
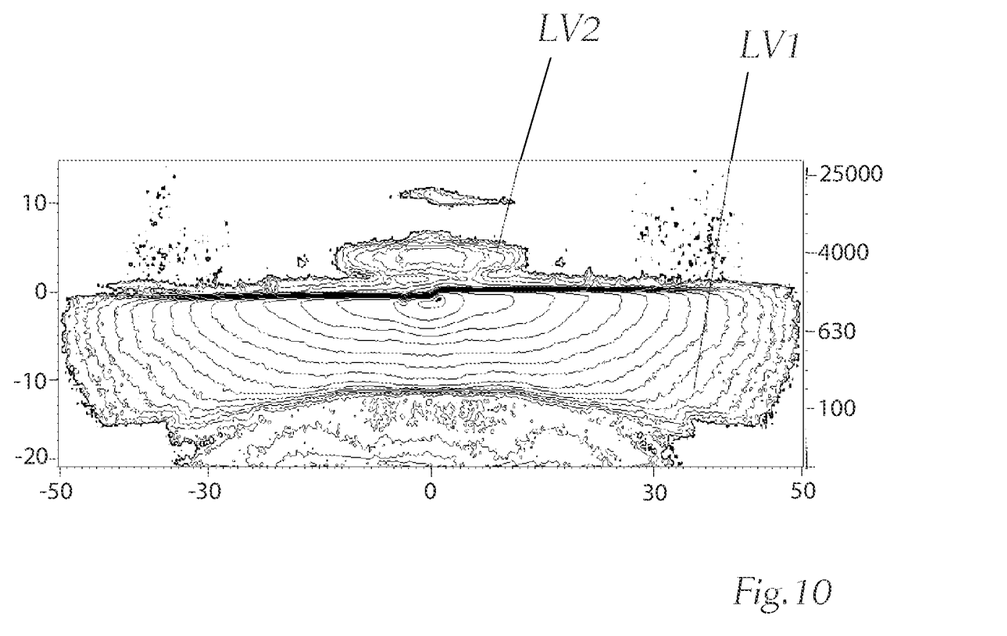
FIG. 10 shows a light distribution generated with the lighting device from FIGS. 8 and 9.

FIGS. 8 and 9 show an implementation possibility of a lighting device 1 according to the invention by way of example, with four units 2 in the upper row and five units 2 in the lower row. An optional aperture 6 is also shown in this case; the light distributions LV1 and LV2 are shown in FIG. 10.

As described, a lighting device according to the invention can be provided, for example, for a motor vehicle headlight or to form a motor vehicle headlight. In this context, a lighting device according to the invention can be used, for example, to generate a (symmetrical or asymmetrical) low beam distribution, high beam distribution, apron light distribution, cornering light, etc., or any combination of light distributions of this type.

The lighting device according to the invention can also be used in a rear light, signal light, etc. of a motor vehicle.

Due to the configuration according to the invention, see in particular FIGS. 1 and 2, with the same length of the overall system and the same distance from the light source to the target plane (imaging plane)/focal plane ZBE, ZBE'/BE or the projection device to the target plane (imaging plane), in the case of an arrangement according to the prior art, a much larger, i.e. higher and/or wider collimator and a correspondingly larger projection device would be necessary, since the light beams in the prior art have a significantly greater divergence than in the solution according to the invention and thus a significantly larger intermediate light image.

The invention claimed is:

1. A lighting device (1) for a motor vehicle headlight and/or for a rear light of a motor vehicle and/or for a signal light for a motor vehicle for generating at least one light distribution (LV1, LV2) or a partial light distribution, the lighting device (1) comprising:
one or more imaging units (2), wherein each imaging unit (2) is configured to generate an intermediate light image in an imaging plane (ZBE, ZBE') specific for the respective imaging unit, wherein each imaging unit (2) is composed of a light source (3) and a collimator optics (4) or comprises a light source (3) and a collimator optics (4), wherein the collimator optics (4) consist in each case of a body (4A) which is formed from a transparent, light-guiding material, wherein the body (4A) has a light coupling region (41A), a delimiting surface (41B), and a light exit surface (41C), and wherein light coupled into the body (4A) via the light coupling region (41A) is partly propagated directly in the direction of the light exit surface (41C) and is partly directed to the delimiting surface (41B), on which it is reflected in the direction of the light exit surface (41C), preferably totally reflected, and wherein the collimator optics (4) of each imaging unit (2) are designed in such a way that the light emitted by the light source (3) of the respective imaging unit (2) in the imaging plane (ZBE, ZBE') specific for the respective imaging unit (2) is imaged as an intermediate light image, and wherein the lighting device (1) comprises at least one projection device (5), having an optical axis (X), which at least one projection device (5) has a focal plane (BE),
wherein at least one of the imaging units (2) is configured as a convergence imaging unit (2), the at least one convergence imaging unit (2) being characterized in that the body (4A) of the collimator optics (4) is designed such that that part of the light, which is coupled into the body (4A) via the light coupling region (41A) and propagates directly in the direction of the light exit surface (41C), as well as the other part of the coupled light which is reflected on the delimiting surface (41B), in particular totally reflected, form a collimator body light bundle (KLB, KLB') converging into a common virtual intermediate light image plane (VBE, VBE'), the light exit surface (41C) being concavely curved and the virtual intermediate light image plane (VBE, VBE') lying in front of the specific imaging plane (ZBE, ZBE') of the at least one convergence imaging unit (2) in the direction of light propagation, the virtual imaging plane being a plane in which a real intermediate image would only be generated if the light beams were not deflected on the light exit surface (41C) of the body (4A), and the light exit surface (41C) of the body (4A) being designed in such a way that when the collimator body light bundle (KLB, KLB') exits from the body (4A), the light beams are deflected at the light exit surface (41C) and are formed into an exit light bundle (ALB, ALB') such that the light beams of the exit light bundle (ALB, ALB') form the intermediate light image in the imaging plane (ZBE, ZBE'), the imaging plane (ZBE, ZBE') being inclined to the focal plane (BE) and intersecting the focal plane, preferably in the region of the optical axis (X) or above or below the optical axis (X), and the intermediate light image lying in the imaging plane being imaged by the projection device (5) into a region in front of the lighting device (1) as a light distribution or part of a light distribution.

2. The lighting device according to claim 1, wherein all light beams of the exit light bundle (ALB, ALB') of the at least one convergence imaging unit (2) converge, wherein the light beams of the exit light bundle (ALB, ALB') converge less than the light beams of the collimator body light bundle (KLB).

3. The lighting device according to claim 1, wherein the virtual intermediate light image plane (VBE, VBE') of the at least one convergence imaging unit (2) lies in the light propagation direction after the light exit surface (41C).

4. The lighting device according to claim 1, wherein an aperture device (6) is provided between the at least one convergence imaging unit (2) and the projection device (5), having at least one aperture edge (61), which at least one aperture edge (61) lies substantially in the focal plane (BE) of the projection device (5).

5. The lighting device according to claim 4, wherein the aperture device (6) which is a horizontal aperture (60), which is reflective on its upper side (60A) and/or on its underside (60B).

6. The lighting device according to claim 4, wherein the at least one convergence imaging unit (2) comprises two or more convergence imaging unit (2) and wherein a plurality of or all of the convergence imaging units (2) together are configured to generate a first light distribution (LV1) on one side, above or below, of the aperture device (6).

7. The lighting device according to claim 6, wherein the at least one convergence imaging unit (2) comprises two or more convergence imaging unit (2) and wherein a plurality of or all of the convergence imaging units (2) together are configured to generate a second light distribution (LV2) on one side, below or above, of the aperture device (6), which is on the other side than that side on which the first light distribution (LV1) is generated.

8. The lighting device according to claim 4, wherein the at least one convergence imaging unit (2) comprises two or more convergence imaging unit (2) and a plurality of the convergence imaging units (2) on one side of the aperture device (6) are arranged in one plane.

9. The lighting device according to claim 8, wherein the one plane is a plane parallel to the aperture device (6).

10. The lighting device according to claim 4, wherein in the case of a plurality of convergence imaging units (2) on one side of the aperture device (6), these convergence imaging units (2) are rotated horizontally and/or vertically with respect to one another, in particular in such a way that the intermediate light images generated by the convergence imaging units (2) in the imaging plane (ZBE, ZBE') at least partially overlap or adjoin the immediately adjacent intermediate light images in each case.

11. The lighting device according to claim 4, wherein the aperture device (6) is a horizontal, flat aperture (60), which has the aperture edge (61) in a front region facing the projection device (5).

12. The lighting device according to claim 1, wherein the lighting device (1) has a plurality of imaging units, and wherein at least two of the imaging units (2) are configured as convergence imaging units (2).

13. The lighting device according to claim 1, wherein a plurality of or all of the convergence imaging units (2) jointly generate a first light distribution (LV1).

14. The lighting device according to claim 13, wherein the first light distribution (LV1) is a low beam distribution.

15. The lighting device according to claim 13, wherein a plurality of or all of the convergence imaging units (2) jointly generate a second light distribution (LV2) or jointly generate a part of a second light distribution (LV2), which part together with the first light distribution (LV1) results in the second light distribution.

16. The lighting device according to claim 15, wherein the second light distribution (LV2) is a high beam distribution.

17. The lighting device according to claim 1, wherein the lighting device is designed as a motor vehicle headlight or rear light of a motor vehicle or as a signal light for a motor vehicle.

18. A device comprising one or more of the lighting devices according to claim 1, which is/are configured to generate a high beam distribution, a low beam distribution, or a low beam and high beam distribution.

* * * * *